United States Patent
Barton et al.

(10) Patent No.: US 10,292,364 B2
(45) Date of Patent: May 21, 2019

(54) GPS IMPLANT TRACKING SYSTEM FOR PET

(71) Applicants: Barry Barton, Cameron, MO (US); Dana Barton, Cameron, MO (US)

(72) Inventors: Barry Barton, Cameron, MO (US); Dana Barton, Cameron, MO (US)

( * ) Notice: Subject to any disclaimer, the term of this patent is extended or adjusted under 35 U.S.C. 154(b) by 269 days.

(21) Appl. No.: 15/232,761

(22) Filed: Aug. 9, 2016

(65) Prior Publication Data
US 2018/0042202 A1 Feb. 15, 2018

(51) Int. Cl.
| | | |
|---|---|---|
| *A01K 11/00* | (2006.01) | |
| *A01K 29/00* | (2006.01) | |
| *A01K 27/00* | (2006.01) | |
| *G01S 19/14* | (2010.01) | |
| *H02J 7/02* | (2016.01) | |
| *H02J 7/04* | (2006.01) | |
| *H02J 50/12* | (2016.01) | |

(52) U.S. Cl.
CPC .......... *A01K 11/008* (2013.01); *A01K 27/009* (2013.01); *A01K 29/005* (2013.01); *G01S 19/14* (2013.01); *H02J 7/025* (2013.01); *H02J 7/042* (2013.01); *H02J 50/12* (2016.02)

(58) Field of Classification Search
CPC .. A01K 11/008; A01K 27/009; A01K 29/005; G01S 19/14; H02J 7/025
USPC ...................................................... 340/573.3
See application file for complete search history.

(56) References Cited

U.S. PATENT DOCUMENTS

| | | | |
|---|---|---|---|
| 7,102,508 B2 | 9/2006 | Edelstein et al. | |
| 7,589,638 B2 | 9/2009 | Jackson et al. | |
| 8,188,869 B2 | 5/2012 | Wangrud | |
| 9,055,733 B2 | 6/2015 | Johnny | |
| 2002/0100425 A1 | 8/2002 | Meyers et al. | |
| 2006/0287693 A1* | 12/2006 | Kraft | A61N 1/025 607/60 |
| 2009/0237236 A1 | 9/2009 | Maassarani | |
| 2010/0321182 A1* | 12/2010 | Wangrud | A01K 11/008 340/539.13 |
| 2012/0206296 A1* | 8/2012 | Wan | A01K 11/008 342/357.31 |
| 2013/0030255 A1* | 1/2013 | Embry, II | A61B 5/686 600/300 |

(Continued)

FOREIGN PATENT DOCUMENTS

WO  WO 2017207981 A1 * 12/2017 .......... A01K 11/008

*Primary Examiner* — Hirdepal Singh
(74) *Attorney, Agent, or Firm* — Law Office of Jerry D Haynes PA; Jerry D Haynes

(57) ABSTRACT

A implant tracking system for allowing the location of an animal to be tracked from an implanted device that is not readily removable includes an implant member having an internal positioning component that is connected to an internal rechargeable power component and a wearable charger implement that includes an inductive charging band, a wire charging port, an internal charger battery, and an attachment mechanism. In one instance, the positioning component is a satellite positioning system receiver. In use, it is contemplated that the implant member is implanted under the skin of a pet or other animal whose location is desired to be tracked while the wearable charger can be removably positioned on the pet in order to wirelessly recharge the power component of the implant member through inductive charging.

6 Claims, 1 Drawing Sheet

(56) References Cited

U.S. PATENT DOCUMENTS

| | | | |
|---|---|---|---|
| 2013/0267962 A1* | 10/2013 | Michelson | A61B 17/00 606/116 |
| 2014/0285339 A1 | 9/2014 | Thalheim | |
| 2014/0338447 A1* | 11/2014 | Sharpe | A01K 29/005 73/431 |
| 2016/0101291 A1* | 4/2016 | Jaax | A61N 1/3787 607/61 |
| 2016/0120154 A1* | 5/2016 | Hill | A01K 29/005 340/573.3 |
| 2016/0135431 A1* | 5/2016 | Sheldon | H02J 7/0047 119/859 |
| 2017/0094946 A1* | 4/2017 | Giunta | A01K 27/009 |
| 2017/0095206 A1* | 4/2017 | Leib | G16H 40/63 |

\* cited by examiner

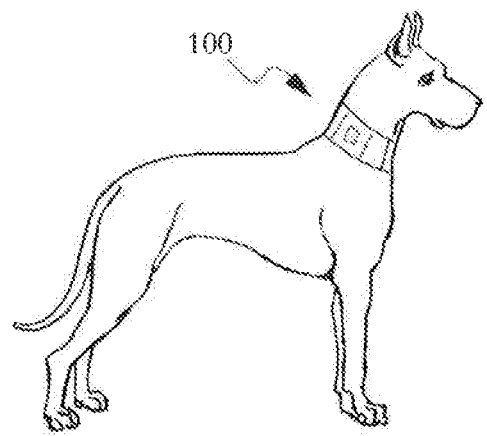
Fig. 1
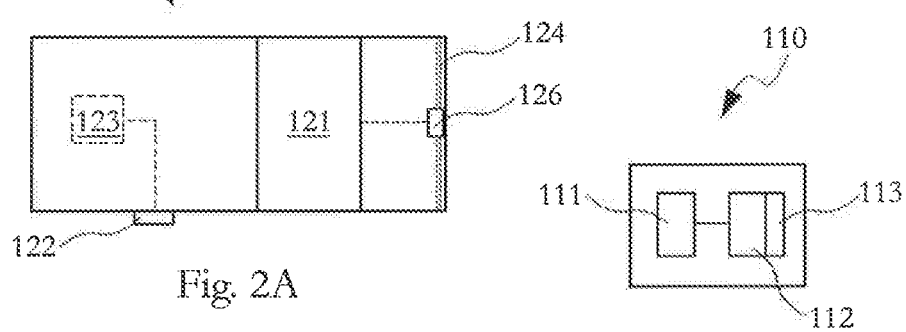
Fig. 2A
Fig. 3
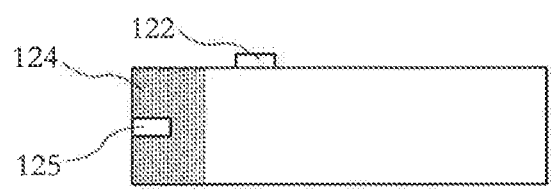
Fig. 2B

GPS IMPLANT TRACKING SYSTEM FOR PET

BACKGROUND OF THE INVENTION

Field of the Invention

This invention relates generally to tracking systems and, more particularly, to a satellite positioning implant module for a pet that has an inductive charging collar.

Description of the Prior Art

The use of tracking devices which employ wireless technologies to locate lost pets is well known. Such devices, which generally employ technologies such as satellite positioning technologies, wireless networking technologies, near field communication technologies, and/or radio frequency identification technologies, are often embodied in removable collars or harnesses. As a result, a problem which still exists is that such existing tracking devices are often easily removed by in the event a pet is kidnapped or stolen. Thus, there remains a need for an implant tracking system for a pet which includes a satellite positioning module and rechargeable battery. It would be helpful if such an implant tracking system was adapted to be recharged wirelessly through a wearable collar. It would be additionally desirable for such an implant tracking system to be configured to automatically relay position data to a software interface that is installed on a remote computer.

The Applicant's invention described herein provides for an implant tracking system adapted to secure the ability to track the location of a pet on an ongoing basis. The primary components in Applicant's implant tracking system are an implant member and a wearable charger. When in operation, the implant tracking system enables the location of a pet to be tracked in a manner that cannot be disable by a thief. As a result, many of the limitations imposed by prior art structures are removed.

SUMMARY OF THE INVENTION

A implant tracking system for allowing the location of an animal to be tracked from an implanted device that is not readily removable. The implant tracking system comprises an implant member defining an implantable housing having an internal positioning component that is connected to an internal rechargeable power component and a wearable charger defining a collar or other wearable implement that includes an inductive charging band, a wire charging port, an internal charger battery, and an attachment mechanism. In one embodiment, the positioning component defines a satellite positioning system receiver, such as a Global Positioning System ("GPS") receiver. In use, it is contemplated that the implant member is implanted under the skin of a pet or other animal whose location is desired to be tracked while the wearable charger is suited to be removably positioned on the pet where it can recharge the power component of the implant member through inductive charging.

It is an object of this invention to provide an implant tracking system for a pet which includes a satellite positioning module and rechargeable battery.

It is another object of this invention to provide an implant tracking system adapted to be recharged wirelessly through a wearable collar.

It is yet another object of this invention to provide an implant tracking system to be configured to automatically relay position data to a conventional software interface that is installed on a remote computer.

These and other objects will be apparent to one of skill in the art.

BRIEF DESCRIPTION OF THE DRAWINGS

FIG. 1 is a side perspective view of the components of an implant tracking system built in accordance with the present invention in place on a dog.

FIG. 2A is a bottom plan view of the wearable charger of an implant tracking system built in accordance with the present invention.

FIG. 2B is a top plan view of the wearable charger of an implant tracking system built in accordance with the present invention.

FIG. 3 is a block diagram of the implant member of an implant tracking system built in accordance with the present invention.

DETAILED DESCRIPTION OF THE INVENTION

Referring now to the drawings and in particular FIGS. 1, 2, and 3, an implant tracking system 100 is shown as an implant member 110 and a wearable charger 120. In use, it is contemplated that the implant member 110 is implanted under the skin of a pet or other animal whose location is desired to be tracked while the wearable charger 120 is suited to be removably positioned on the pet.

In this regard, the implant member 110 defines an implantable housing having an internal positioning component 111 that is connected to an internal rechargeable power component. In one embodiment, the positioning component 111 defines a satellite positioning system receiver, such as a GPS receiver which operates in conjunction with existing GPS satellites to determine the geographic position of the implant member 110 and relay position data to a remote computer through the GPS system, as is inherent with conventional GPS receivers.

The rechargeable power component includes a rechargeable battery 112 with a receiving induction coil 113 connected thereto. Through the connection to the positioning component 111, the battery 112 is able to supply stored electricity to the positioning component 111 so as to energize the positioning component 111 and enable its operation. At the same time, the receiving induction coil 113 is operative to take power from an electromagnetic field generated nearby, convert the power to electric current, and supply the electric current to the battery 112 so as to supply the electricity to the battery 112 that is stored for future use by the positioning component. As such, it is contemplated that the battery 112 may include a charging controller to optimize the charging process.

In the illustrated embodiment, the wearable charger 120 defines a collar that includes an inductive charging band 121, a wire charging port 122, such as a USB port, an internal charger battery 123, and opposing attachment surfaces 124. The charging band 121 includes a generating induction coil that is operative to take power as electrical current and generate an electromagnetic field. It is contemplated that this electromagnetic field is used by the receiving induction coil 113 to wirelessly transfer power from the wearable charger 120 to the implant member 110.

The wire charging port 122 is electrically connected to the internal charging battery 123 so as to direct electricity supplied to the wire charging port 122 to the charging battery 123 for storage. The charging battery 123 is electrically connected to a first electrical contact 125 disposed at one of the wearable charger 120 and the generating induction coil is electrically connected to a second electrical contact 126 at the opposite end of the wearable charger 120. In this regard, when the opposing ends of the wearable charger 120 are attached (and only when the opposing ends are attached), the first electrical contact 125 and the second electrical contact 126 connect and electricity from the charging battery 123 is directed to the generating induction coil.

It is contemplated that the opposing attachment surfaces 124 define in one embodiment opposing elements of a hook and loop fastener so as to releasably hold the opposing ends of the wearable charger 120 together on contact.

In one embodiment, one of the first electrical contact 125 and the second electrical contact 126 define a magnet, with the other defining a ferromagnetic material. In this regard, magnetic attraction between the first electrical contact 125 and the second electrical contact 126 supplements the attachment force of the opposing attachment surfaces 124.

In use, it is appreciated that a user may track the position of a pet in which the implant member 110 has been implanted by receiving the relay of positioning data transmitted by the implant member 110.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An implant tracking system, comprising:
a wearable charger adapted to be removably positioned on an animal and having an inductive charging band, a charging port and an internal charger battery, wherein said inductive charging band includes a generating induction coil operative to generate a charging electromagnetic field when supplied with electricity and internal charger battery is operative to selectively supply electricity to the generating induction coil;
an implant member defining an implantable housing having an internal positioning component that is connected to and energized by an internal rechargeable power component that includes a battery and a receiving induction coil, wherein said internal positioning component defines a satellite positioning system receiver operative to determine the geographic position of the implant member and relay position data through a satellite positioning system;
wherein said receiving induction coil is operative to convert the charging electromagnetic field into electricity when in range of the charging electromagnetic field and said receiving induction coil is adapted to direct the converted electricity from the charging electromagnetic field to the battery; and
a first electrical contact and a second electrical contact integral with said wearable charger, wherein the internal charger battery is operative to selectively supply electricity to the generating induction coil only when the first electrical contact is in contact with the second electrical contact.

2. The implant tracking system of claim 1, additionally comprising a first attachment surface integral with a first end of the wearable charger and a second attachment surface integral with a second end of said wearable charger, wherein said first attachment surface and second attachment surface adapt the first end and second end to removably attach to one another so as to hold the first electrical contact and the second electrical in contact.

3. The implant tracking system of claim 2, wherein said the first electrical contact is adjacent to the first attachment surface and the second electrical contact is adjacent to the second attachment surface.

4. The implant tracking system of claim 1, wherein said wearable charger defines an elongated collar having a first end and a second end, additionally comprising a first electrical contact integral with said first end and a second electrical contact integral with said second end, wherein the internal charger battery is operative to selectively supply electricity to the generating induction coil only when the first electrical contact is in contact with the second electrical contact.

5. The implant tracking system of claim 4, additionally comprising a first attachment surface integral with the first end and a second attachment surface integral with the second end, wherein said first attachment surface and second attachment surface adapt the first end and second end to removably attach to one another so as to hold the first electrical contact and the second electrical in contact.

6. The implant tracking system of claim 5, wherein said the first electrical contact is adjacent to the first attachment surface and the second electrical contact is adjacent to the second attachment surface.

* * * * *